United States Patent
Guo et al.

(10) Patent No.: US 10,306,222 B2
(45) Date of Patent: May 28, 2019

(54) METHOD AND APPARATUS OF DIRECTIONAL INTRA PREDICTION

(75) Inventors: Mei Guo, San Jose, CA (US); Xin Zhao, Beijing (CN); Xun Guo, Beijing (CN); Shaw-Min Lei, Hsinchu (TW)

(73) Assignee: HFI INNOVATION INC., Zhubei, Hsinchu County (TW)

( * ) Notice: Subject to any disclaimer, the term of this patent is extended or adjusted under 35 U.S.C. 154(b) by 300 days.

(21) Appl. No.: 14/123,095

(22) PCT Filed: Jun. 20, 2012

(86) PCT No.: PCT/CN2012/077212
§ 371 (c)(1),
(2), (4) Date: Nov. 28, 2013

(87) PCT Pub. No.: WO2012/175017
PCT Pub. Date: Dec. 27, 2012

(65) Prior Publication Data
US 2014/0092980 A1    Apr. 3, 2014

Related U.S. Application Data

(60) Provisional application No. 61/498,973, filed on Jun. 20, 2011.

(51) Int. Cl.
*H04N 7/36* (2006.01)
*H04N 7/34* (2006.01)
(Continued)

(52) U.S. Cl.
CPC ........... *H04N 19/105* (2014.11); *H04N 19/14* (2014.11); *H04N 19/157* (2014.11);
(Continued)

(58) Field of Classification Search
CPC ...... H04N 19/14; H04N 19/182; H04N 19/52; H04N 19/593
(Continued)

(56) References Cited

U.S. PATENT DOCUMENTS

| 8,971,652 B2 | 3/2015 | Drugeon et al. |
| 2009/0097557 A1 | 4/2009 | Takahashi et al. |

(Continued)

FOREIGN PATENT DOCUMENTS

| CN | 1662066 A | 8/2005 |
| CN | 101529916 A | 9/2009 |

(Continued)

OTHER PUBLICATIONS

Chinese language office action dated Mar. 21, 2016, issued in application No. CN 201280027898.0.
(Continued)

*Primary Examiner* — Gims S Philippe
*Assistant Examiner* — Mainul Hasan
(74) *Attorney, Agent, or Firm* — McClure, Qualey & Rodack, LLP (57) ABSTRACT

A method and apparatus for intra prediction for a current block using directional intra prediction based on neighboring pixels around the current block are disclosed. Embodiment according to the present invention derives the gradient for the current pixel from the neighboring reconstructed pixels along a prediction direction of directional intra prediction. The gradient derived is used to form the final intra prediction. In another embodiment of the present invention, the intra prediction for slant vertical and horizontal directions is derived based on the neighboring reconstructed pixels in a neighboring row adjacent to the top side of the
(Continued)

current block and the neighboring reconstructed pixels in a neighboring column adjacent to the left side of the current block.

20 Claims, 4 Drawing Sheets

(51) Int. Cl.
  *H04N 19/105* (2014.01)
  *H04N 19/593* (2014.01)
  *H04N 19/14* (2014.01)
  *H04N 19/182* (2014.01)
  *H04N 19/157* (2014.01)
  *H04N 19/176* (2014.01)

(52) U.S. Cl.
  CPC ......... *H04N 19/182* (2014.11); *H04N 19/593* (2014.11); *H04N 19/176* (2014.11)

(58) Field of Classification Search
  USPC .................................................. 375/240.16
  See application file for complete search history.

(56) References Cited

U.S. PATENT DOCUMENTS

| | | | |
|---|---|---|---|
| 2009/0110069 A1* | 4/2009 | Jung | H04N 19/61 375/240.12 |
| 2011/0090969 A1* | 4/2011 | Sung | H04N 19/105 375/240.25 |

FOREIGN PATENT DOCUMENTS

| | | |
|---|---|---|
| CN | 101931820 | 12/2010 |
| CN | 101931820 A | 12/2010 |
| EP | 1684529 A2 | 7/2006 |
| EP | 2 200 324 | 6/2010 |
| JP | 200994828 | 4/2009 |
| JP | 2009284275 | 12/2009 |
| WO | WO 2005/088972 | 9/2005 |
| WO | WO 2009/090884 | 7/2009 |
| WO | WO 20111021838 | 2/2011 |

OTHER PUBLICATIONS

"Interpolation techniques research based on H.264 standard of Chinese Master's These Full-text Database Information Science and Technology;" May 2009.

Translation of relevant paragraphs of "Interpolation techniques research based on H.264 standard of Chinese Master's These Full-text Database Information Science and Technology".

English language translation of abstract of JP 200994828 (published Apr. 30, 2009).

English language translation of abstract of JP 2009284275 (published Dec. 3, 2009).

Zhou, J., et al.; "An Interpolation Method by Predicting the Direction of Pixel Texture Changing Trend for H.264/AVC Intra Prediction;" Second International Symposium on Intelligent Information Technology Application; IEEE; 2008; pp. 884-888.

Guo, M., et al.; "Direction based Angular Intra Prediction, JCTVC-F122;" 6th Meeting; Jul. 2011; pp. 1-8.

Minezawa, A., et al.; "An improved intra vertical and horizontal prediction, JCTVC-F172;" 6th Meeting; Jul. 2011; pp. 1-7.

Li, et al.; "Gradient Intra Prediction for Coding of Computer Animated Videos;" IEEE; 2006; pp. 50-53.

* cited by examiner

METHOD AND APPARATUS OF DIRECTIONAL INTRA PREDICTION

CROSS REFERENCE TO RELATED APPLICATIONS

The present invention claims priority to U.S. Provisional Patent Application, Ser. No. 61/498,973, filed Jun. 20, 2011, entitled "Enhanced Directional Intra Prediction". The U.S. Provisional Patent Application is hereby incorporated by reference in its entirety.

TECHNICAL FIELD

The present invention relates to video coding. In particular, the present invention relates to coding techniques associated with enhanced directional intra prediction.

BACKGROUND

Motion compensated inter-frame coding has been widely adopted in various coding standards, such as MPEG-1/2/4 and H.261/H.263/H.264/AVC. While motion compensated inter-frame coding can effectively reduce bitrate for compressed video, intra coding is still required to compress the regions with high motions or scene changes. Besides, intra coding is also used to process an initial picture or to periodically insert I-pictures (or Intra-coded picture, I-picture), and the I-pictures are inserted periodically to allow quick access to the compressed video data or to alleviate error propagation. In some cases, intra coding may perform better than inter coding.

Intra prediction exploits the spatial correlation within a picture or within a picture region by using reconstructed pixels in the neighboring region around a current block. The neighboring region usually comprises an area above the boundary line of a current block and an area to the left side of the current block. In H.264, intra prediction modes including DC, Vertical, and Horizontal modes are developed to provide prediction for pixels in a block based on neighboring reconstructed pixels. The High-Efficiency Video Coding (HEVC) standard being developed exploits block-based spatial prediction extensively. A large number of intra prediction modes are used by HEVC to exploit spatial features. Beside the DC, Vertical and Horizontal modes adopted by H. 264, HEVC also includes many other directional prediction modes (also called angular prediction modes in this disclosure).

For Vertical mode, the intra prediction for a current pixel in a block is selected from a reference pixel in a neighboring row adjacent to the top side of the block, where the reference pixel in the same column as the current pixel is selected. For Horizontal mode, the intra prediction for the current pixel in the block is selected from a reference pixel in a neighboring column adjacent to the left side of the current block, where the reference pixel in the same row as the current pixel is selected. HEVC further extends the concept to other angular directions (Thomas Wiegand, et al., "*WD4: Working Draft 4 of High-Efficiency Video Coding*", Joint Collaborative Team on Video Coding (JCT-VC) of ITU-T SG16 WP3 and ISO/IEC TC1/SC29/WG11, 6th Meeting: Torino, IT, 14-22 July, 2011, Document: JCTVC-F803). The prediction for a pixel in the block is based on a reference position in a neighboring row adjacent to the top side of the current block or a reference position in a neighboring column adjacent to the left side of the current block along the angular direction. If the reference position is located at an integer position, the respective neighboring reconstructed pixel is used. Otherwise, interpolation based on two adjacent integer pixels is used. While the use of directional intra prediction in HEVC improves the performance of intra prediction over H.264, it is desirable to further improve the performance.

SUMMARY

A method and apparatus for intra prediction for the current block using directional intra prediction based on neighboring pixels around the current block are disclosed. In one embodiment according to the present invention, the method and apparatus for intra prediction comprise steps of receiving neighboring reconstructed pixels corresponding to a neighboring region of the current block; deriving gradient for a current pixel in the current block from the neighboring reconstructed pixels along a prediction direction of directional intra prediction; and providing an intra predictor for the current pixel, wherein the intra predictor comprises the gradient. The intra predictor comprises a first part corresponding to a first intra predictor based on non-gradient intra prediction along the prediction direction and a second part corresponding to the gradient weighted by a weighting factor. Gradient for the vertical, horizontal, slant vertical and slant horizontal directions are derived from the neighboring reconstructed pixels respectively. The gradient derived is then weighted and added to non-gradient based intra prediction to form the final intra prediction. The neighboring region can be one or a combination of at least one neighboring row above the current block, at least one neighboring column at the left of the current block, and the above-left corner of the current block.

In another embodiment of the present invention, the method comprises receiving first neighboring reconstructed pixels corresponding to a neighboring-row adjacent to a top side of the current block; receiving second neighboring reconstructed pixels corresponding to a neighboring-column adjacent to a left side of the current block; deriving an intra predictor for a current pixel based on said first neighboring reconstructed pixels and said second neighboring reconstructed pixels; and providing the intra predictor for the current pixel. The intra predictor comprises a first part corresponding to an initial intra prediction using said first neighboring reconstructed pixels or said second neighboring reconstructed pixels according to the prediction direction and a second part using said second neighboring reconstructed pixels or said first neighboring reconstructed pixels respectively. Derivation for the first part and the second are described for slant vertical and horizontal directions. The final intra prediction is generated using a weighted sum of the first part and the second part according to a weighting factor.

DETAILED DESCRIPTION

Figure 1:
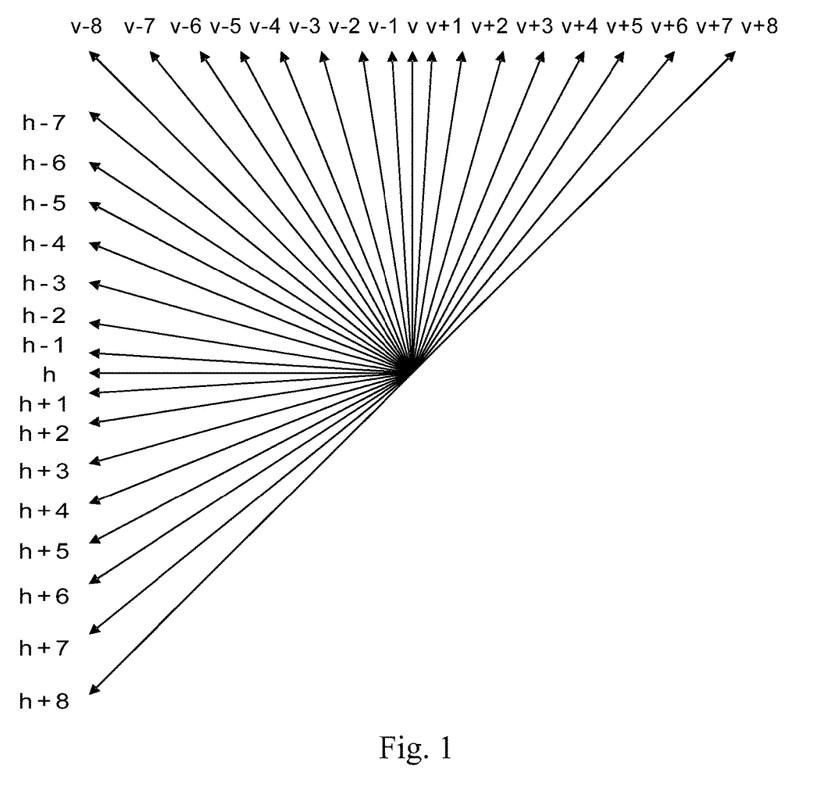
FIG. 1 illustrates the directional intra prediction modes of High-Efficiency Video Coding (HEVC).

In HEVC, angular prediction modes are used to exploit spatial features. The block size (i.e., the Prediction Unit (PU) size) supported includes 64×64, 32×32, 16×16, 8×8, and 4×4. For all block sizes, there are 35 modes including 33 directional prediction modes as shown in FIG. 1, DC mode and Planar mode. In the vertical direction, there are slant prediction modes other than Vertical mode (i.e., mode v as shown in FIG. 1). These slant angular prediction modes in the vertical direction include v−8 through v−1 and v+1 through v+8 as shown in FIG. 1. The slant angular prediction modes in the horizontal direction include h−7 through h−1 and h+1 through h+8 as shown in FIG. 1. For convenience, the angular prediction modes from v−8 to v−1 and from v+1 to v+8 are called slant vertical prediction and the corresponding directions are called slant vertical directions. Similarly, the slant angular prediction modes from h−7 to h−1 and from h+1 to h+8 are called slant horizontal prediction and the corresponding directions are called slant horizontal directions.

Figure 2:
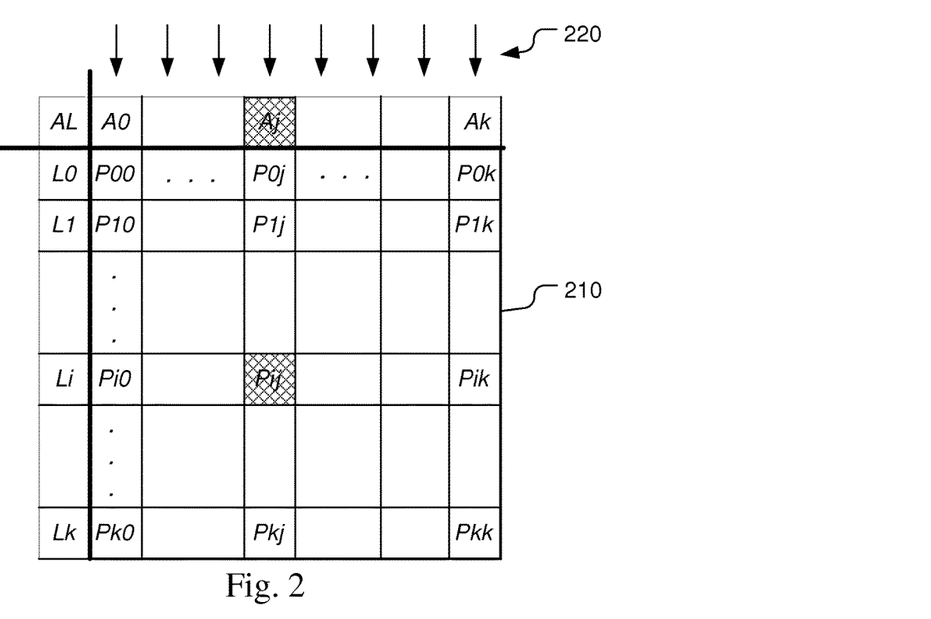
FIG. 2 illustrates the vertical intra prediction of HEVC, where the predictor Pij is derived based on neighboring reconstructed pixel Aj in the same column.

FIG. 2 illustrates an example of vertical prediction adopted by HEVC. The neighboring reconstructed pixels, A0 through Ak, in the neighboring row adjacent to the top side of the current block 210 are used to generate intra prediction for pixels within the current block 210. The block size in FIG. 2 is (k+1)×(k+1). Arrows 220 indicate the prediction direction. Each of pixels A0 through Ak is used to generate intra prediction for pixels in the respective column of the current block for the Vertical mode. For example, the neighboring reconstructed pixel Aj is used to generate intra prediction P0j, P1j, . . . , Pij, . . . , and Pkj, where Pij is the intra prediction at i-th row and j-th column. Similarly, the neighboring reconstructed pixels, L0 through Lk, in the neighboring column adjacent to the left side of the current block 210 are used to generate intra prediction for pixels within the current block 210 when the Horizontal mode is selected. In that case, each of pixels L0 through Lk is used to generate intra prediction for pixels in the respective row of the current block.

Figure 3:
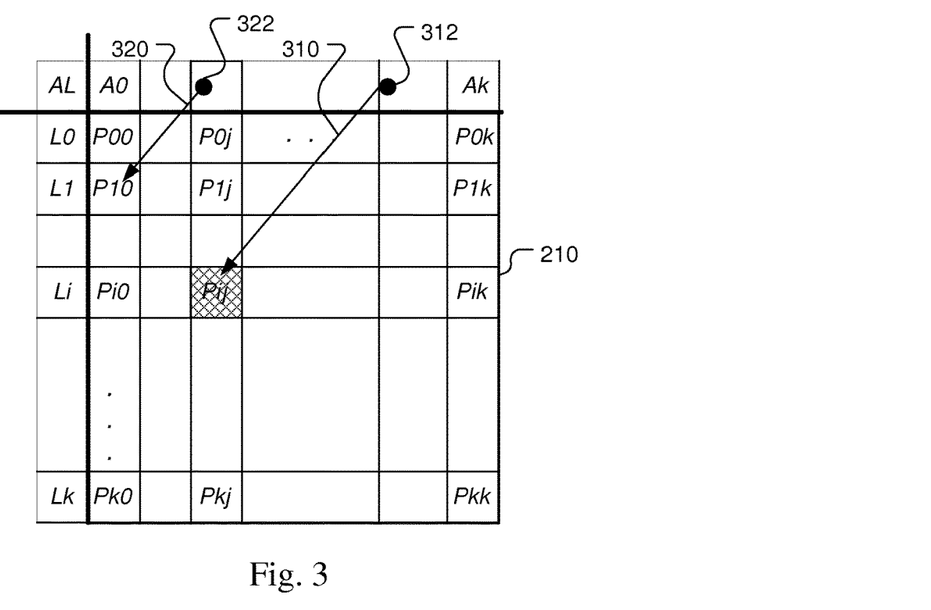
FIG. 3 illustrates angular intra prediction of HEVC for a slant vertical direction, where the predictor Pij is derived based on a reference pixel in the neighboring row according to the prediction direction.

FIG. 3 illustrates an example of directional prediction adopted by HEVC for slant vertical prediction from v+1 to v+8. Arrow 310 indicates the prediction direction for one of the directional prediction mode from v+1 to v+8 to generate intra prediction Pij. Arrow 320 indicates the same prediction direction to generate intra prediction P10. Position 312 indicates a reference pixel in the neighboring row used to generate intra prediction Pij. If the reference pixel is located at an integer position, the respective neighboring reconstructed pixel (A0 through Ak) is used to generate Pij. Otherwise, two adjacent neighboring reconstructed pixels are interpolated to generate Pij. For directional prediction from v−1 to v−8, the intra prediction can be generated from the neighboring reconstructed pixels (not shown in FIG. 3) in the neighboring row adjacent to the top of the current block 210 and in the neighboring column adjacent to the left side of the current block 210. The intra prediction for the slant horizontal directions can be derived similarly as described in the HEVC Wording Draft 4 document.

The directional prediction for Vertical, Horizontal, slant vertical and slant horizontal directions as described above illustrates intra prediction adopted by HEVC WD4. The intra prediction method adopted by HEVC WD4 uses the reference pixel as the intra predictor for the current pixel, where the reference pixel is projected along the prediction direction to the current pixel. The reference pixel is selected among the neighboring reconstructed pixels in the neighboring row adjacent to the top of the current block or in the neighboring column adjacent to the left of the current block based on the intra prediction mode and the location of the current pixel. Embodiments according to the present invention utilize gradient information to improve the performance of intra prediction. The gradient is computed from the neighboring reconstructed pixels along the prediction direction.

Figure 4:
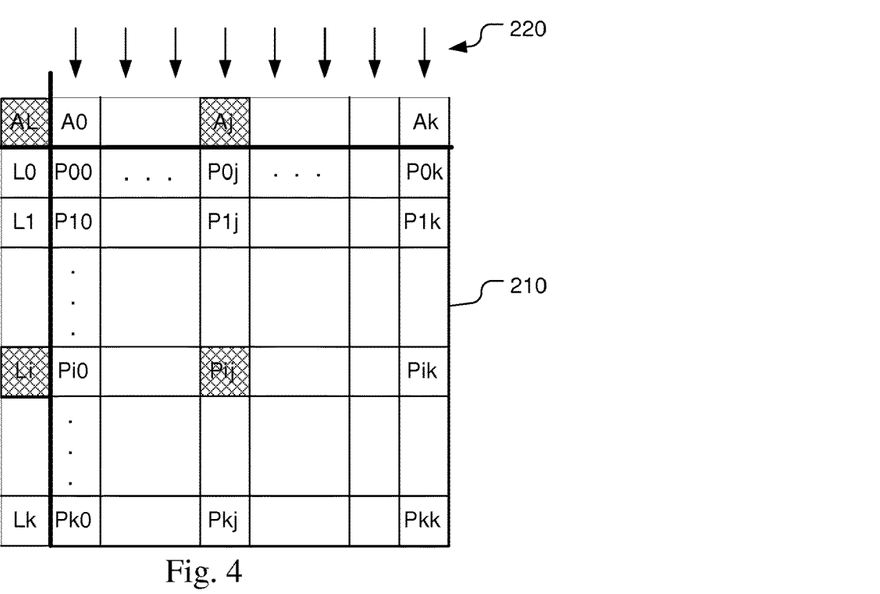
FIG. 4 illustrates an example of gradient based intra prediction in the vertical direction for Pij according to an embodiment of the present invention, where the gradient is derived based on AL and Li.

FIG. 4 illustrates an example of gradient-based intra prediction for the vertical direction according to the present invention. The neighboring reconstructed pixels in the neighboring column adjacent to the left side of the current block are used to derive the gradient when the vertical prediction is used. For example, pixel Li in the same row as Pij and pixel AL from the above-left corner of the current block may be used to derive the gradient, i.e., (Li−AL), where Pij is derived according to convention intra prediction. The final intra prediction P'ij for the vertical intra prediction can be generated according to:

$$P'ij = Pij + \alpha(j) \cdot (Li - AL), \quad (1)$$

where $\alpha(j)$ is a weighting factor with a value between 0 and 1. The value for the weighting factor may be dependent on the column location of the current pixel. Since the gradient is computed based on the neighboring column adjacent to the left side of the current block, the gradient may have more influence on the pixels closer to the neighboring column. For example, value assignment for $\alpha(j)$ can be $\alpha(0)=\frac{1}{2}$, $\alpha(1)=\frac{1}{4}$, $\alpha(2)=\frac{1}{8}$, $\alpha(3)=\frac{1}{16}$, and $\alpha(5), \ldots, \alpha(k)=0$. When $\alpha(j)$ has a value of 0, it implies that the final intra prediction is not modified by the gradient. The weighting factors listed above are used for illustration purpose. They should not be construed as limitations to the present invention. A skilled person in the art may use other sets of weighting factors to practice the present invention.

The horizontal intra prediction can be derived similarly according to an embodiment of the present invention. The neighboring reconstructed pixels in the neighboring row adjacent to the top side of the current block are used to derive the gradient. For example, pixel Aj in the same column as Pij and pixel AL from the above-left corner of the current block may be used to derive the gradient, i.e., (Aj−AL). The final intra prediction P'ij for the horizontal prediction can be generated according to:

$$P'ij = Pij + \alpha(i) \cdot (Ai - AL). \quad (2)$$

Figure 5:
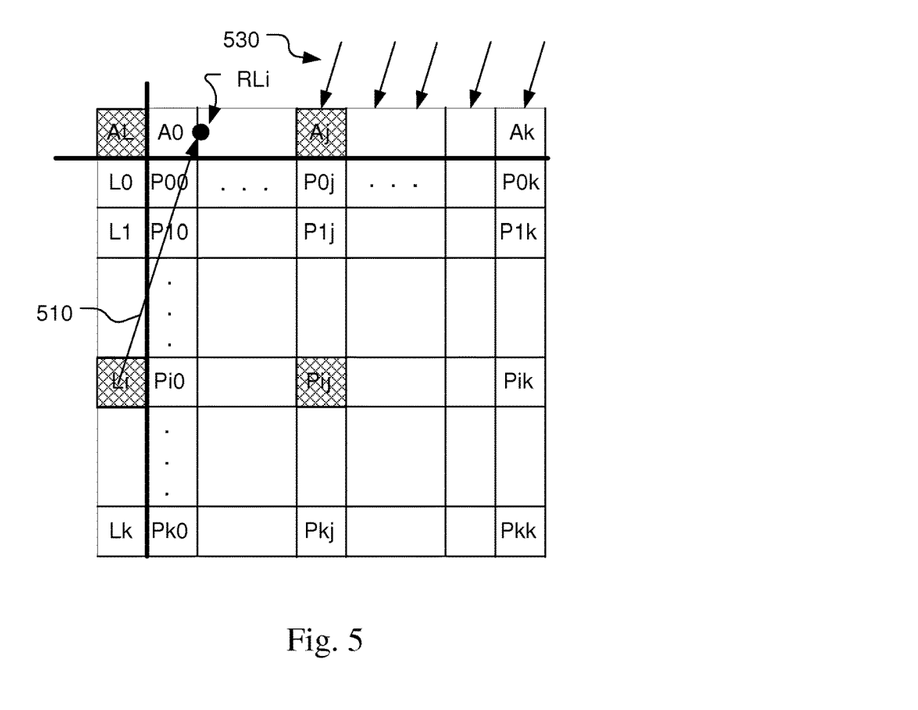
FIG. 5 illustrates an example of gradient based intra prediction in a slant vertical direction for Pij according to an embodiment of the present invention, where the gradient is derived based on RLi and Li.

For slant vertical (v−8, . . . , v−1, v+1, . . . , v+8) and slant horizontal (h−7, . . . , h−1, h+1, . . . , h+8) directions, the gradient can be derived based on neighboring reconstructed pixels in the neighboring row adjacent to the top side of the current block and neighboring reconstructed pixels in the neighboring column adjacent to the left side of the current block. FIG. 5 illustrates an example of gradient based intra prediction for slant vertical prediction directions from v+1 to v+8. As an example, one reference pixel from the neighboring row and one reference pixel from the neighboring column can be used to derive the gradient. Furthermore, the pixel from the neighboring column that is in the same row as the Pij can be selected as a reference pixel. Therefore Li is selected as one reference pixel. The other reference pixel can be determined by projecting Li onto the neighboring row along the prediction direction 510. Accordingly, the other reference pixel RLi associated with Li can be derived. If RLi is not at an integer position, interpolation using pixels at integer positions of the neighboring row can be used to derived the pixel value at a non-integer position. For example, RLi may be linearly interpolated from two adjacent existing pixels. A person skilled in the art may also use other interpolation techniques to derive RLi. The gradient along the prediction direction can be determined according to (Li−RLi) and the final intra prediction is derived as:

$$P'ij=Pij+\alpha(j)\cdot(Li-RLi), \quad (3)$$

where $\alpha(j)$ is a weighting factor having a value between 0 and 1, and $\alpha(j)$ is selected according to the prediction direction and the column index j of the current pixel. For example, value assignment for $\alpha(j)$ may be $\alpha(0)=\frac{1}{4}$ and $\alpha(j)=0$ for $j=1, \ldots, k$. Other $\alpha(j)$ value assignment may also be applied to practice the present invention. Gradient based intra prediction for slant vertical prediction directions from v−8 to v−1 can be derived similarly.

For slant horizontal prediction directions from h+1 to h+8, one reference pixel from the neighboring row and one reference pixel from the neighboring column can be used to derive the gradient. The pixel from the neighboring row that is in the same column as the Pij can be selected as a reference pixel. Therefore Aj is selected as one reference pixel. The other reference pixel can be determined by projecting Aj onto the neighboring column along the prediction direction. Accordingly, the other reference pixel RAj associated with Aj can be derived. If RAj is not at an integer position, interpolation using pixels at integer positions can be used to derived the pixel value at a non-integer position. The gradient along the prediction direction can be determined according to (Aj−RAj) and the final intra prediction is derived as:

$$P'ij=Pij+\alpha(i)\cdot(Aj-RAj). \quad (4)$$

Again, $\alpha(i)$ is a weighting factor having a value between 0 and 1, and $\alpha(i)$ is selected according to the prediction direction and the row index i of the current pixel.

As shown in equations (1) through (4), the final intra prediction for gradient-based directional intra prediction comprises two parts. One part, i.e., Pij corresponds to a conventional intra prediction and the other part is related to the gradient. While the intra prediction according to HEVC WD4 is used as an exemplary conventional intra prediction, any other means that does not rely on the gradient for directional intra prediction may also be used to derive the initial intra prediction. In other words, any non-gradient intra prediction can be used to derive Pij in equations (1) through (4).

In the gradient based intra prediction disclosed above, the gradient is derived along the prediction direction. For slant vertical or horizontal prediction, first reference pixel is select from the neighboring column in the same row as the current pixel or from the neighboring row in the same column as the current pixel respectively. The second reference pixel is determined by projecting the first reference pixel along the prediction direction onto the neighboring row or the neighboring column respectively. The gradient is then calculated based on the first reference pixel and the second reference pixel. Other embodiments of the present invention generate intra prediction based on two reference pixels, where one reference pixel is from the neighboring column adjacent to the left of the current block and the other reference pixel from the neighboring row adjacent to the top of the current block.

Figure 6:
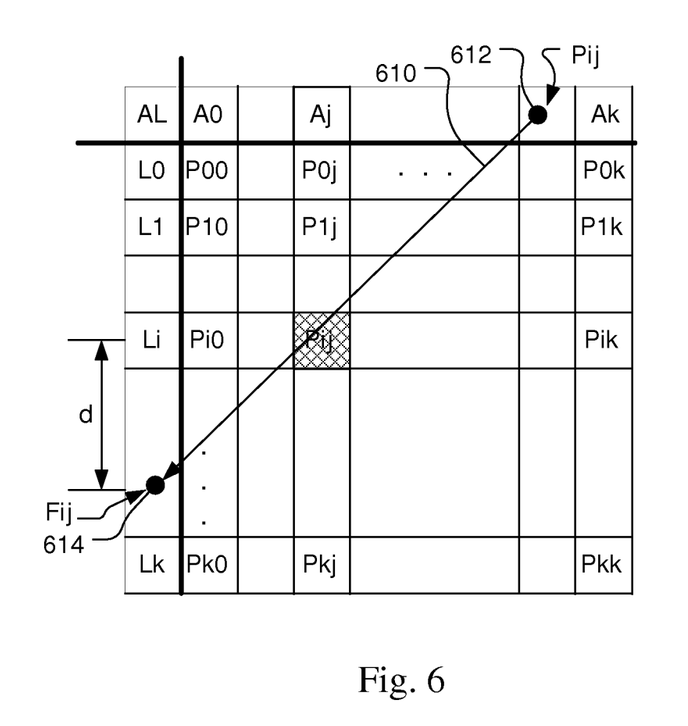
FIG. 6 illustrates an example of intra prediction in a slant vertical direction for Pij according to an embodiment of the present invention, where the intra prediction is derived based on a reference pixel in the neighboring row and a reference pixel in the neighboring column.

FIG. 6 illustrates an example for slant vertical prediction directions from v+1 to v+8 according to the present invention. The intra prediction comprises two parts. The first part is derived from the neighboring row adjacent to the top of the current block, i.e., A0, . . . , Ak. The first part may correspond to the initial intra prediction using the neighboring row according to the prediction direction. For example, HEVC WD4 provides a method to determine Pij from A0, . . . , Ak for each given prediction direction from v+1 to v+8. Based on HEVC WD4, the initial intra prediction for pixel at i-th row and j-th column with prediction direction 610 is derived from position 612 of the neighboring row as shown in FIG. 6. Positing 612 may not fall at an integer position and interpolation may be required to derive the initial intra prediction Pij. In other word, Pij is derived using conventional intra prediction of HEVC WD4. Other means may also be used to derive the initial intra prediction. The second part is derived from the neighboring column adjacent to the left of the current block, i.e., L0, . . . , Lk. The second reference pixel Fij in the neighboring column corresponds to the first reference pixel (i.e., pixel at position 612) along the prediction direction. Accordingly, position 614 is determined and the pixel value is used for Fij. If position 614 falls at a non-integer position, interpolation may be required to derive Fij. The final intra prediction can be generated according to $$P'ij=(1-\alpha(j))\cdot Pij+\alpha(j)\cdot Fij, \quad (5)$$

where $\alpha(j)$ is a weighting factor having a value between 0 and 1, and $\alpha(j)$ is selected according to the prediction direction and the column index j of the current pixel. For example, $\alpha(j)$ value assignment for v+8 can be $\alpha(0)=\frac{1}{2}$, $\alpha(1)=\frac{1}{4}$, $\alpha(2)=\frac{1}{8}$, $\alpha(3)=\frac{1}{16}$, and $\alpha(j)=0$ for $j=4, \ldots, k$. $\alpha(j)$ value assignment for v+7 can be $\alpha(0)=\frac{1}{2}$, and $\alpha(j)=0$ for $j=1, \ldots, k$. $\alpha(j)$ value assignment for v+4, . . . , v+6 can be $\alpha(0)=\frac{1}{4}$, and $\alpha(j)=0$ for $j=1, \ldots, k$. The above intra prediction for slant vertical prediction directions from v−8 to v−1 can be derived similarly.

For slant horizontal prediction directions from h+1 to h+8 according to the present invention, the final intra prediction can be derived similarly. The first part is derived from the neighboring column adjacent to the left of the current block, i.e., L0, . . . ,Lk. The first part may correspond to the initial intra prediction using the neighboring column according to the prediction direction. Pij for a given prediction direction can be determined from L0, . . . , Lk. The second reference pixel Fij in the neighboring row corresponding to Pij along the prediction direction can be determined. If Fij falls at a non-integer position, interpolation may be required to derive Fij. The final intra prediction P'ij can be generated according to:

$$P'ij=(1-\alpha(i))\cdot Pij+\alpha(i)\cdot Fij, \quad (6)$$

where $\alpha(i)$ is a weighting factor having a value between 0 and 1, and $\alpha(i)$ is selected according to the prediction direction and the row index i of the current pixel. Exemplary $\alpha(j)$ value assignment for slant vertical directions may be used for slant horizontal directions. The above intra prediction for slant horizontal prediction directions from h−7 to h−1 can be derived similarly. It is noted that equations (5) and (6) can also be expressed in a form similar to the gradient based intra prediction:

$$P'_{ij}=P_{ij}+\alpha(j)\cdot(F_{ij}-P_{ij}),\quad(7)$$

and $$P'_{ij}=P_{ij}+\alpha(i)\cdot(F_{ij}-P_{ij}).\quad(8)$$

When interpolation is needed for Fij, the interpolation coefficients or weights are dependent on the fractional pixel distances. For various slant vertical and horizontal directions, the associated fractional pixel distance may require numeric representation with fine resolution. This will result in higher computational complexity and cost. Therefore, an embodiment according to the present invention uses approximate positions for interpolation. For example, the actual distances for various slant vertical and horizontal directions are listed in Table 1, where the actual distance d is determined according to HEVC WD4 for v+4/h+4 to v+8/h+8. These actually distances can be replaced by approximate distances to reduce computational complexity and cost for interpolation. The actual distances listed in Table 1 are specific to HEVC WD4. The present invention can also be applied to intra prediction using other slant vertical and horizontal directions. The actual distances may be different for other slant vertical and horizontal directions. The approximate distances can be modified accordingly.

TABLE 1

|  | v + 4/<br>h + 4 | v + 5/<br>h + 5 | v + 6/<br>h + 6 | v + 7/<br>h + 7 | v + 8/<br>h + 8 |
| --- | --- | --- | --- | --- | --- |
| Actual Distance d | 32/13 | 32/17 | 32/21 | 32/26 | 1 |
| Approximate distance d | 9/4 | 7/4 | 3/2 | 5/4 | 1 |

In this disclosure, an enhanced directional intra prediction based on the gradient is described for all prediction directions including vertical, horizontal, slant vertical and slant horizontal directions. The specific directions and the intra prediction derivation according to HEVC WD4 are used to illustrate the gradient based intra prediction. However, the present invention is not limited specific directions and intra prediction derivations. A person skilled in the art may practice the present invention using other prediction directions and/or intra prediction derivations.

In this disclosure, an enhanced directional intra prediction based on the neighboring reconstructed pixels in the neighboring row adjacent to the top side of the current block and the neighboring column adjacent to the left side of the current block is described for slant vertical and slant horizontal directions. In some other embodiments, the gradient based directional intra prediction may use neighboring reconstructed pixels in more than one neighboring rows or neighboring reconstructed pixels in more than one neighboring columns to derive the intra predictor. Again, the specific directions and the intra prediction derivation according to HEVC WD4 are used to illustrate the enhanced intra prediction. However, the present invention is not limited to the specific directions and the intra prediction derivation. A person skilled in the art may practice the present invention in a system using other prediction directions and/or intra prediction derivations. The two reference points based intra prediction using a neighboring row and a neighboring column and the gradient based intra prediction can be selectively applied to slant vertical and horizontal prediction according to the prediction direction. For example, the gradient based intra prediction may perform better for smaller slant angles and therefore, the gradient based intra prediction can be applied to smaller slant angles such as v−3, . . . , v−1, v+1, . . . , v+1, h−3, . . . , h−1, and h+1, . . . , h+3. On the other hand, the two reference points based intra prediction using a neighboring row and a neighboring column may work better for larger slant angles. Therefore, the two reference points based intra prediction can be applied to larger slant angles such as v−8, . . . , v−4, v+4, . . . , v+8, h−7, . . . , h−4, and h+4, . . . , h+8.

The above description is presented to enable a person of ordinary skill in the art to practice the present invention as provided in the context of a particular application and its requirements. Various modifications to the described embodiments will be apparent to those with skill in the art, and the general principles defined herein may be applied to other embodiments. Therefore, the present invention is not intended to be limited to the particular embodiments shown and described, but is to be accorded the widest scope consistent with the principles and novel features herein disclosed. In the above detailed description, various specific details are illustrated in order to provide a thorough understanding of the present invention. Nevertheless, it will be understood by those skilled in the art that the present invention may be practiced.

Embodiment of video systems incorporating encoding or decoding of intra prediction for a current block using directional intra prediction based on neighboring pixels around the current block according to the present invention as described above may be implemented in various hardware, software codes, or a combination of both. For example, an embodiment of the present invention can be a circuit integrated into a video compression chip or program codes integrated into video compression software to perform the processing described herein. An embodiment of the present invention may also be program codes to be executed on a Digital Signal Processor (DSP) to perform the processing described herein. The invention may also involve a number of functions to be performed by a computer processor, a digital signal processor, a microprocessor, or field programmable gate array (FPGA). These processors can be configured to perform particular tasks according to the invention, by executing machine-readable software code or firmware code that defines the particular methods embodied by the invention. The software code or firmware codes may be developed in different programming languages and different formats or styles. The software code may also be compiled for different target platforms. However, different code formats, styles and languages of software codes and other means of configuring code to perform the tasks in accordance with the invention will not depart from the spirit and scope of the invention.

The invention may be embodied in other specific forms without departing from its spirit or essential characteristics. The described examples are to be considered in all respects only as illustrative and not restrictive. The scope of the invention is, therefore, indicated by the appended claims rather than by the foregoing description. All changes which come within the meaning and range of equivalency of the claims are to be embraced within their scope.

The invention claimed is:

1. A method for block-based intra prediction for a current block using directional intra prediction based on neighboring pixels around the current block, the method comprising:
receiving neighboring reconstructed pixels corresponding to a neighboring region of the current block, wherein one or more reference pixels are selected among the neighboring reconstructed pixels in at least one of: a neighboring-row adjacent to a top side of the current block, and a neighboring-column adjacent to a left side of the current block;

deriving a gradient for each current pixel in the current block from the one or more reference pixels along a prediction direction of directional intra prediction;

providing an intra predictor for each current pixel, wherein the intra predictor comprises the gradient; and encoding or decoding the current block based on the intra predictors for the current pixels;

wherein the intra predictor for each current pixel is derived by a sum of a first part corresponding to a first intra predictor based on non-gradient block-based intra prediction along the prediction direction and a second part corresponding to the gradient, the first intra predictor not based on a gradient-based determination, wherein the second part corresponding to the gradient is weighted by a weighting factor selected according to the prediction direction and one of a column position or a row position of the current pixel, wherein the weighting factor has a value between 0 and 1.

2. The method for claim 1, wherein the prediction direction corresponds to vertical direction and wherein the reference pixels are selected from the neighboring reconstructed pixels in the neighboring-column adjacent to the left side of the current block.

3. The method for claim 2, wherein the reference pixels comprise a first neighboring reconstructed pixel and a second neighboring reconstructed pixel, and wherein the first neighboring reconstructed pixel corresponds to an above-left pixel in the neighboring-column of the current block and the second neighboring reconstructed pixel corresponds to a pixel of the neighboring-column in a same row as the current pixel.

4. The method for claim 3, wherein the non-gradient intra prediction is based on a reference pixel of the neighboring-row adjacent to the top side of the current block, wherein the reference pixel corresponds to one of the neighboring reconstructed pixels that is in a same column as the current pixel.

5. The method for claim 1, wherein the prediction direction corresponds to horizontal direction and wherein the reference pixels are selected from the neighboring reconstructed pixels in the neighboring-row adjacent to the top side of the current block.

6. The method for claim 5, wherein the reference pixels comprise a first neighboring reconstructed pixel and a second neighboring reconstructed pixel, and wherein the first neighboring reconstructed pixel corresponds to an above-left pixel in the neighboring-row of the current block and the second neighboring reconstructed pixel corresponds to a pixel of the neighboring-row in a same column as the current pixel.

7. The method for claim 6, wherein the non-gradient intra prediction is based on a reference pixel of the neighboring-column adjacent to the left side of the current block, and wherein the reference pixel corresponds to one of the neighboring reconstructed pixels in a same row as the current pixel.

8. The method for claim 1, wherein the prediction direction corresponds to a slant vertical direction, wherein the reference pixels comprise a first reference pixel in the neighboring-column adjacent to the left side of the current block and a second reference pixel in the neighboring-row adjacent to the top side of the current block, wherein the first reference pixel corresponds to one of the neighboring reconstructed pixels of the neighboring-column that is in a same row as the current pixel, and wherein the second reference pixel is associated with the first reference pixel along the slant vertical direction.

9. The method for claim 8, wherein the second reference pixel is interpolated from the neighboring reconstructed pixels at integer positions in the neighboring-row according to the slant vertical direction if the second reference pixel is located at a non-integer position.

10. The method for claim 9, wherein the non-gradient intra prediction is derived from the neighboring reconstructed pixels of the neighboring-row according to the slant vertical direction.

11. The method for claim 1, wherein the prediction direction corresponds to a slant horizontal direction, wherein the reference pixels comprise a first reference pixel in the neighboring-row adjacent to the top side of the current block and a second reference pixel in the neighboring-column adjacent to the left side of the current block, wherein the first reference pixel corresponds to one of the neighboring reconstructed pixels of the neighboring-row that is in a same column as the current pixel, and wherein the second reference pixel is associated with the first reference pixel along the slant horizontal direction.

12. The method for claim 11, wherein the second reference pixel is interpolated from the neighboring reconstructed pixels at integer positions of the neighboring column according to the slant horizontal direction if the second reference pixel is located at a non-integer position.

13. The method for claim 12, wherein the non-gradient intra prediction is derived from the neighboring reconstructed pixels of the neighboring-column according to the slant horizontal direction.

14. An apparatus for block-based intra prediction for a current block using directional intra prediction based on neighboring pixels around the current block, the apparatus comprising at least one circuit configured to:

receive neighboring reconstructed pixels corresponding to a neighboring region of the current block, wherein one or more reference pixels are selected among the neighboring reconstructed pixels in at least one of: a neighboring-row adjacent to a top side of the current block, and a neighboring-column adjacent to a left side of the current block;

derive a gradient for each current pixel in the current block from the reference pixels along a prediction direction of directional intra prediction;

provide an intra predictor for each current pixel, wherein the intra predictor comprises the gradient; and encoding or decoding the current block based on the intra predictors for the current pixels;

wherein the intra predictor for each current pixel is derived by a sum of a first part corresponding to a first intra predictor based on non-gradient block-based intra prediction along the prediction direction and a second part corresponding to the gradient, the first intra predictor not based on a gradient-based determination, wherein the second part corresponding to the gradient is weighted by a weighting factor selected according to the prediction direction and one of a column position or a row position of the current pixel, wherein the weighting factor has a value between 0 and 1.

15. The apparatus for claim 14, wherein the prediction direction corresponds to vertical direction and wherein the reference pixels are selected from the neighboring reconstructed pixels in the neighboring-column adjacent to the left side of the current block.

16. The apparatus for claim 14, wherein the prediction direction corresponds to horizontal direction and wherein the reference pixels are selected from the neighboring reconstructed pixels in the neighboring-row adjacent to the top side of the current block.

17. The apparatus for claim 14, wherein the prediction direction corresponds to a slant vertical direction, wherein the reference pixels comprise a first reference pixel in the neighboring-column adjacent to the left side of the current block and a second reference pixel in the neighboring-row adjacent to the top side of the current block, wherein the first reference pixel corresponds to one of the neighboring reconstructed pixels of the neighboring-column that is in a same row as the current pixel, and wherein the second reference pixel is associated with the first reference pixel along the slant vertical direction.

18. The apparatus for claim 14, wherein the prediction direction corresponds to a slant horizontal direction, wherein the reference pixels comprise a first reference pixel in the neighboring-row adjacent to the top side of the current block and a second reference pixel in the neighboring-column adjacent to the left side of the current block, wherein the first reference pixel corresponds to one of the neighboring reconstructed pixels of the neighboring-row that is in a same column as the current pixel, and wherein the second reference pixel is associated with the first reference pixel along the slant horizontal direction.

19. The method for claim 1, wherein the weighting factor is selected according to the column position of the current pixel responsive to the prediction direction comprising one of: a vertical direction, a horizontal direction, or a slant vertical direction.

20. The method for claim 1, wherein the weighting factor is selected according to the row position of the current pixel responsive to the prediction direction comprising a slant horizontal direction.

* * * * *